(12) United States Patent
Lee et al.

(10) Patent No.: US 6,218,352 B1
(45) Date of Patent: Apr. 17, 2001

(54) COMPOSITE COMPOSITION COMPRISING SODIUM PERCARBONATE WITH IMPROVED SOLUBILITY

(75) Inventors: Sang Hwa Lee, Ichonsi; Chong Yun Kwag; Jong Pill Lee, both of Seoul; Han Seog Cho, Inchonsi, all of (KR)

(73) Assignee: Oriental Chemical Industries (KR)

( * ) Notice: Subject to any disclaimer, the term of this patent is extended or adjusted under 35 U.S.C. 154(b) by 0 days.

(21) Appl. No.: 09/265,261

(22) Filed: Mar. 9, 1999

(51) Int. Cl.$^7$ .................................................. C11D 3/10
(52) U.S. Cl. ................................................................ 510/375
(58) Field of Search ..................................... 510/372, 375

(56) References Cited

U.S. PATENT DOCUMENTS 4,086,175 * 4/1978 Kravetz et al. ......................... 252/99
4,440,732 * 4/1984 Takeda et al. ..................... 423/415 P
5,346,680 * 9/1994 Roesler et al. ......................... 423/274
5,851,420 * 12/1998 Kim et al. ......................... 252/186.27

FOREIGN PATENT DOCUMENTS

496430A1 * 7/1992 (EP) .

OTHER PUBLICATIONS

Journal of Japanese Industrial Explosive Association (vol. 37, No. 2, 1976, pp 84–90.

* cited by examiner

Primary Examiner—John Hardee
(74) Attorney, Agent, or Firm—Finnegan, Henderson, Farabow, Garrett and Dunner

(57) ABSTRACT

This invention relates to a composite composition comprising granular sodium percarbonate with better stability in storage and fast solubility in water for the purpose of the sole use thereof or as a composition of a bleaching agent.

4 Claims, No Drawings

COMPOSITE COMPOSITION COMPRISING SODIUM PERCARBONATE WITH IMPROVED SOLUBILITY

This substitute specification, written in accordance with 37 C.F.R. §1.125 (b), is a substitute for the specification of record originally filed on Mar. 9, 1999 as part of application Ser. No. 09/265,261. There is no new matter contained in this substitute specification.

BACKGROUND OF THE INVENTION

1. Field of the Invention

This invention relates to a composite composition comprising granular sodium percarbonate with better stability in storage and fast solubility in water to be used by itself or as a composition of a bleaching agent.

2. Description of the Prior Art

The use of sodium percarbonate and sodium perborate in powder form have been used for many years as bleaching agents for clothes. When used as a beaching agent, sodium perborate requires an activator. Due to recent trends in environmental and energy conservation, there has been a demand for the use of sodium percarbonate which is readily soluble in cold water and does not require an activator. However, in order to be an affective bleaching agent, it is critical that sodium percarbonate not decompose during its delivery or storage, not lose any active oxygen, and quickly dissolve in water.

A highly soluble form of sodium percarbonate is desirable in order to effectively wash cotton-based clothes. In a typical washing scenario, cotton based clothes, white clothes and dirty socks, are pre-soaked in water prior to washing. Sodium percarbonate is added to cold water together with a detergent and the clothes and left for a couple of hours prior to washing. If the sodium percarbonate particles can be readily dissolved in the wash water, damage or discoloration of the clothes may be prevented. Additionally, if the time needed to solubilize sodium percarbonate in unagitated water is shortened, the overall wash time may be shortened.

In general, smaller particles are more readily dissolved in water, therefore selection of a smaller particled, micropowder form of sodium percarbonate may shortened its solubilization time. However, in detergents containing zeolite, the zeolite significantly reduces the stability of sodium percarbonate. A sodium percarbonate micro-powder mixed with zeolite decomposes very quickly and makes it impossible to use sodium percarbonate as a component of a bleaching detergent. To lessen the decomposition affect, commercially available sodium percarbonate is in granular form instead of micro-powder. Accordingly, the granular sodium percarbonate's solubility in water is reduced.

To solve these problems, many inventions related to the stabilization and composition of sodium percarbonate have been disclosed for the past 10 years. Among these inventions, European patent No. 567,140 discloses a novel stabilization method in which the surface of sodium percarbonate particles are coated with boric acid or borate. However, this patent has disadvantages in that stability was not as good as expected, and the solubility rate in water was far slower than that of the conventional product.

One conventional method to increase the solubility rate of sodium percarbonate in water is the thermal treatment of sodium percarbonate as disclosed in U.S. Pat. No. 3,953,350.

Sodium percarbonate is decomposed at temperatures of more than 120° C. to generate hydrogen peroxide, its primary decomposition product. Further, in parallel with the continuous decomposition, oxygen and water are generated as a final decomposition product, as disclosed in The Journal of Japan Industrial & Chemical Association (Vol. 47, No. 2, 1976, pp 84–90). These gaseous molecules remain trapped in the sodium percarbonate crystal lattice and are released when the sodium percarbonate is dissolved in water. This imparts a foaming action to the sodium percarbonate particles when they are dissolved in water. However, this method has proven to be uneconomical in that micro-powder is generated during the thermal treatment of sodium percarbonate, and the loss of active oxygen is inevitable.

Japan Unexamined Patent Application No. Hei 9-227108 discloses a process to improve the stability and the solubility of sodium percarbonate when it is blended with detergents by coating the surface of sodium percarbonate particles. A description of the process is outlined below.

A binder is added to wet sodium percarbonate prepared by the wet process method. The binder and sodium percarbonate mixture is then granulated. On average, particle sizes of up to 800 μm are formed. Next, the mixture is dried and coated again using fluidized-bed technology. Coating materials include: amino acid derivatives, aliphatic, aromatic polycarboxylic acid and the salts thereof. The object of the invention recited in Japan Unexamined Patent Application No. Hei 9-227108) is to produce large particles of sodium percarbonate. However, in light of the adverse solubility effects associated with larger, granulated sodium percarbonate particles, it is questionable whether improved solubility is achieved in this process. Furthermore, this Japanese invention requires processing steps for the manufacture, fabrication and coating of the sodium percarbonate particles. The processing steps are very complicated resulting in enormous production costs.

SUMMARY OF THE INVENTION

The objective of the invention is to provide a stable, granular, sodium percarbonate composition and the process of manufacturing thereof, wherein the sodium percarbonate composition contains a compound designed to promote solubility of sodium percarbonate in water and a stabilizer in order to ensure that sodium percarbonate is not decomposed during transportation or storage, while said sodium percarbonate is readily dissolved in water.

DETAILED DESCRIPTION OF THE INVENTION

This invention provides a sodium percarbonate bleaching agent which has high solubility in cold water, high storage stability and relatively high concentrations of active oxygen. The invention has accomplished this by forming a composition of: sodium percarbonate, one or more stabilizing agents and one or more soubilizing agents and hydrogen peroxide.

To achieve the embodiment herein, the composition of this invention includes sodium percarbonate generated by the reaction in which hydrogen peroxide solution is sprayed onto sodium carbonate anhydride, two well-known stabilizers, and one or more solubilizing promoters. The two well known stabilizers used are sodium silicate and magnesium sulfate. The solubilizing promoters may be selected from the following three groups, A, B, and C:

A) an aliphatic or aromatic amino and its salts having one or more sulfonic acid groups, carboxyl groups or phosphonic groups;

B) fatty acids having 10–12 carbons; polyols selected from sugars, polyhydroxy aldehydes, polyhydroxy ketones, and polyglycerines; esters formed from at least one of said fatty acids and at least one of said polyols, wherein a polyoxyethylene is added to said ester; and cyclic or open-chain forms of hemiacetals or acetals having more than four carbons.

C) a polymer compound whose degree of polymerization is 50–10,000, expressed by the following chemical formula 1:

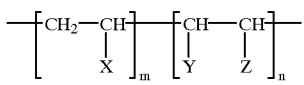

(1)

wherein, m+n=100%, n is a whole number
X represents —OH, —C$_6$H$_5$, —C$_6$H$_5$SO$_3$M, or —COOH;
Y and Z represent the same or different functional groups such as —H, —OPO(OH)$_2$, —OCOR, or —COOM;
(R is an alkyl group having 1~4 of the number of carbon, and M is hydrogen or alkaline metal).

Further, this invention is characterized in that one or more stabilizers or solubilizing promoters selected from the above three groups A, B and C, can be added either to the solution of hydrogen peroxide or the sodium carbonate anhydride for reaction in a mixing vessel.

This invention is explained in more detail below.

While sodium carbonate anhydride is being stirred in a mixing vessel together with commonly used stabilizers, hydrogen peroxide solution at a high concentration is sprayed into the mixing vessel. With the addition of a solution of hydrogen peroxide, the temperature of the reactants is increased. However, due to the wetting of the reactants by water, it is difficult to maintain or increase agitation. This lack of sufficient agitation, results in poor heat dissipation. To overcome this shortcoming, cool air is influxed into the mixing vessel so as to lower the temperature of the mixture and to adjust the amount of water. The sodium percarbonate particles generated under both proper stirring and cool air influx, are well massed without any decomposition. This situation results in properly sized granules. The granules are passed into the fluidized-layer dryer. Thus producing a granular sodium percarbonate. During the process, a small amount of micro-powder sodium percarbonate is generated. The micro-powder is recycled back to the mixing vessel for more enhanced yield. Actually, the process including reaction and drying according to this invention is applicable to the continuous industrial production.

The stabilizers and solubilizing promoters of this invention, designed to better improve the stability and solubility of the sodium percarbonate produced in this process are described in detail below.

Magnesium sulfate in a form of hydrates including pentahydrate or heptahydrate is a well-known stabilizer. Another well known stabilizer is sodium silicate including glass water and solid sodium silicate hydrate in various molar ratios (SiO$_2$:Na%O:H$_2$O).

Some compounds belonging to A group are reagents which may form a complex with metal ions and include picolinic acid, taurine (2-Aminoethane sulfonic acid), sodium salt of N-(2-Hydroxyethyl) ethylenediamine-N,N,N-triacetic acid, NTA (nitrilotriacetic acid), EDTA (ethylene diamine tetra acetic acid), ATMPT [amino tri (methylene phosphonic acid)], and DTPMPA [Diethylene triamine penta (methylene phosphonic acid}.

Further, some compounds belonging to B group include sugar, mannitol, sucrose and polyhydroxy aldehyde; or carbohydrates and glycerines with simple structures represented by polyhydroxy ketone, polyglycerine, and ester compounds containing both fatty acid having 10~20 carbons and above mentioned materials, such as glycerine fatty acid ester, sugar ester and other compounds where polyoxyethylene is added to ester compound consisting of polyol and fatty acid. Such ester compounds in a variety of forms have been manufactured for marketing based on the hydrocarbon contained in the fatty acid and the number of hydroxy groups (—OH) contained in the ester. The items commercialized by Sakamoto Co. include hexaglycerine monostearate and decaglycerine tristearate. Other commercialized items include; mono-, di-, and tri-sugar stearate by Ryoto Co.

Some polymer compounds, expressed by the following chemical formula, which belong to the C group whose degree of polymerization is 50–10,000, are added to the reaction between sodium carbonate anhydride and hydrogen peroxide solution. These compounds contribute much to the adjusting of the size of sodium percarbonate particles, so generated, and the stablilization thereof. The appropriate polymer compounds include polystyrene sulfonic acid, polyacrylic acid, copolymer of both acrylic acid and maleic acid, polyvinylacetate and the derivatives thereof, and the salts where the functional groups of these compounds are substituted with alkaline metal.

The amounts of the compounds contained in the above three groups (A, B and C) which are placed into a mixing vessel as solubilizing promoters for sodium percarbonate particles may vary according to the purpose of use. The proper amounts of such compounds to 100 wt % of sodium carbonate are as follows: the amount of compounds belonging to group A or B should be in the range of 0.015 wt %, while that of compounds belonging to C group should be in the range of 0.01–10 wt %.

In order to prepare a granular sodium percarbonate of this invention having an excellent stability in storage and solubility in cold water, one or more compounds selected from the three groups (A, B and C) are added into the mixing reactor together with well-known stabilizers such as sodium silicate and magnesium sulfate to yield sodium percarbonate. These additives prepared in the form of solution or powder are continuously charged into a mixing vessel.

This invention is explained in more detail based on the following examples but is not limited by the examples herein.

EXAMPLE 1

A multi-purpose mixer (Mixer AR4010) produced by Erweka Co. of Germany was used as a mixing vessel designed to prepare sodium percarbonate. The mixing vessel equipped with a planetary stirring unit and rotary Teflon scraper is an useful instrument which can remove the reacting materials attached to the inside wall of the bottle and ensure the homogeneous mixing within a short period of time. The volume of the stainless mixing vessel is 5L (working capacity: 60%). The mixing vessel was cooled by dipping it into a thermostat consisting of ice and water.

First, a mixture of sodium silicate pentahydrate (12 g) and sodium carbonate anhydride (800 g) was placed into the mixing vessel for sufficient stirring. Magnesium sulfate heptahydrate (5 g) and 60% hydrogen peroxide solution (500 g) in picolinic acid (5 g) were slowly sprayed onto the mixture of sodium carbonate and sodium silicate via a nozzle placed on the upper part of the mixing vessel. When the reaction was successfully completed by controlling the stirring and spraying rates, somewhat wet sodium percarbonate was moved to fluidized bed dryer (FBD) (rapid dryer TG 100, Retsch Co. of Germany). The wet sodium percarbonate was dried at 70° C. for 10 minutes.

The dried sodium percarbonate was sieved with mesh No. 20 and screened with the mesh No. 60. The particles, so selected, was stored in a humidity chamber (temperate: 32° C. and relative humidity: 80% ) for two weeks in order to measure the active oxygen. Meanwhile, under the condition of no stirring, the time of solubilization of sodium peroxide to water at 20° C. was measured by the method of conductivity.

EXAMPLE 2

Sodium percarbonate was prepared utilizing the same general procedure as described in example 1, however, 5 g of taurine(2-aminoethane sulfonic acid) was substituted in place of the picolinic acid used in example 1. A stability test was conducted and its results are found in the Table 1.

EXAMPLE 3

Sodium percarbonate was prepared utilizing the same general procedure as described in example 1, however, 5 g of Mg salt of N-(2-Hydroxyethyl)-imino diacetic acid was substituted in place of the picolinic acid used in example 1. A stability test was conducted and its results are found in the Table 1.

EXAMPLE 4

Sodium percarbonate was prepared utilizing the same general procedure as described in example 1, however, 6.5 g of Na salt of N-(2-Hydroxyethyl)ethylene diamine-N,N,N-triacetic acid was substituted in place of the picolinic acid used in example 1. A stability test was conducted and its results are found in the Table 1.

Stability test

A sodium percarbonate sample (2.0 g), as prepared in example 1, was placed in a 20 mL polyethylene bottle and sealed with an aluminium foil instead of a lid. Three needle holes were pierced into the aluminum foil for air flow. The polyethylene bottle containing sodium percarbonate was stored in a humidity chamber (temperate: 32° C. and relative humidity: 80%) for two weeks in order to measure the active oxygen.

The above described procedure was carried out for the remaining sodium percarbanate samples as prepared in examples 2–4. The results of the stability tests are summarized in Table 1.

TABLE 1

| | Example | | |
|---|---|---|---|
| No. | Additives | Active oxygen (%) | Stability on high humidity (%) |
| 1 | Picolinic acid 5 g | 13.70 | 92.0 |
| 2 | Taurine 5 g | 13.64 | 93.5 |
| 3 | HIMDA, Mg salt 5 g | 13.46 | 94.2 |
| 4 | HEDTA, Na salt 6.5 g | 13.55 | 91.6 |

EXAMPLE 5

Sodium percarbonate was prepared utilizing the same general procedure as described in example 1, however, 6 g of lauryl acid sugar ester L-1695 was substituted in place of the picolinic acid used in example 1. A stability test was conducted and its results are found in the Table 2.

EXAMPLE 6

Sodium percarbonate was prepared utilizing the same general procedure as described in example 1, however, 6 g of lauryl acid sugar ester LWA-1570 was substituted in place of the picolinic acid used in example 1. A stability test was conducted and its results are found in the Table 2.

EXAMPLE 7

Sodium percarbonate was prepared utilizing the same general procedure as described in example 1, however, 2 g of FA-090 (oleyl fatty acid ester having ethylene oxide of 9 mole) was substituted in place of the picolinic acid used in example 1. A stability test was conducted and its results are found in the Table 2.

EXAMPLE 8

Sodium percarbonate was prepared utilizing the same general procedure as described in example 1, however, 3.5 g of GLUCOPON 220 UP (alkylpolyglycoside) was substituted in place of the picolinic acid used in example 1. A stability test was conducted and its results are found in the Table 2.

EXAMPLE 9

Sodium percarbonate was prepared utilizing the same general procedure as described in example 1, however, 6 g of PS-35 (sodium polystyrene sulfonate) was substituted in place of the picolinic acid used in example 1. A stability test was conducted and its results are found in the Table 2.

Solubility test 1L of tap water was poured into a 1L beaker equipped with an conductivity measuring electrode. The temperature of the water was maintained at 20° C. using a thermostat. 5 g of sodium percarbonate, as prepared in example 5, was charged to the floor of the beaker to insure homogenous dispersion. The conductivity of the solution was measured until the sodium percarbonate was completely dissolved. Conductivity changes as a function of time were plotted using a graph recorder. The solubility time of the sodium percarbonate in stagnant water was determined at the instant when 98.0% of the conductivity was lost when the sodium percarbonate was completely dissolved.

The above described procedure was carried out for the remaining sodium percarbanate samples as prepared in examples 6–9. The results of the stability tests are summarized in Table 2.

TABLE 2

| No. | Additives | Active oxygen (%) | Time of solubility (min) |
|---|---|---|---|
| 5 | L-1695 6 g | 13.55 | 60 |
| 6 | LWA-1570 6 g | 13.43 | 45 |
| 7 | FA-090 2 g | 13.58 | 110 |
| 8 | GLUCOPON-220 UP 3.5 g | 13.32 | 91 |
| 9 | PS-35 6 g | 13.64 | 50 |

EXAMPLE 10

In the same procedure as described in the example 1, sodium percarbonate was prepared for its stability and solubility tests with the addition of well known stabilizers sodium silicate pentahydrate (12 g) and magnesium sulfate heptahydrate (5 g), together with each of stabilizer or solubilizing promoter selected from the above groups A, B, C:

| Category | Amount |
| --- | --- |
| Vinyl acetate derivative (DP 500) | 8 g |
| Taurine | 3 g |
| DTPMPA | 2 g |

The results are summarized in the following table 3.

EXAMPLE 11

In the same procedure as described in the example 1, sodium percarbonate was prepared for its stability and solubility tests with the addition of well known stabilizers sodium silicate pentahydrate (12 g) and magnesium sulfate heptahydrate (5 g), together with each of stabilizer or solubilizing promoter selected from the above groups A, B, C:

| Category | Amount |
| --- | --- |
| Vinyl acetate copolymer (DP 1700) | 6 g |
| Mannitol | 4 g |
| ATMPA | 3 g |

The results are summarized in the following table 3.

TABLE 3

| No. | Additives | Active oxygen (%) | Time of solubility (min) | Stability on high humidity (%) |
| --- | --- | --- | --- | --- |
| 10 | Vinyl acetate copolymer (DP 500) 8 g Taurine 3 g DTPMA 2 g | 13.58 | 40 | 94.8 |
| 11 | Vinyl acetate derivative (DP 1700) 6 g Mannitol 4 g ATMPA 3 g | 13.50 | 50 | 95.2 |

COMPARATIVE EXAMPLE 1

In the same procedure as described in the example 10, sodium percarbonate was prepared for its stability and solubility tests with the addition of well known stabilizers sodium silicate pentahydrate (12 g) and magnesium sulfate heptahydrate (5 g) in the absence of any additives. The results are summarized in the following table 4.

COMPARATIVE EXAMPLE 2

The stability and solubility test for sodium percarbonate (Degussa), which is now under market, were performed and its results are summarized in the following table 4.

COMPARATIVE EXAMPLE 3

The stability and solubility test for sodium percarbonate (Solvay-interox), which is now under market, were performed and its results are summarized in the following table 4.

TABLE 4

| No. | Additives | Active oxygen (%) | Time of solubility (min) | Stability on high humidity (%) |
| --- | --- | --- | --- | --- |
| 1 | Blank | 13.28 | 230 | 92.2 |
| 2 | Degussa | 12.55 | 140 | 90.4 |
| 3 | Solvay-interox | 13.45 | 160 | 93.5 |

What is claimed is:

1. A sodium percarbonate composition having improved solubility, wherein said sodium percarbonate composition is a reaction product of a mixture comprising, sodium carbonate anhydride, hydrogen peroxide, magnesium sulfate, sodium silicate, and at least one additive selected from a polymer of Formula (1)

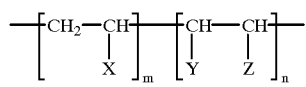

in which:

m+n =100%, wherein n is a positive whole number,

X represents an —OH, a —$C_6H_5$, a —$C_6H_5SO_3M$ or a —COOH,

Y and Z which may be identical or different functional groups, wherein said functional groups are, —H, OPO$(OH)_2$, OCOR, or —COOM, R represents a $C_1$–$C_4$ alkyl group M represents a hydrogen, or an alkaline metal.

2. A sodium percarbonate composition having improved solubility according to claim 1, further comprising at least one additive selected from Groups A and B; wherein said Groups A and B comprise, A) an aliphatic or aromatic amine and its salts having one or more sulfonic acid groups, carboxyl groups or phosphonic groups;

B) fatty acids having 10–12 carbons; polyols selected from sugars, polyhydroxy aldehydes, polyhydroxy ketones, and polyglycerines; esters, formed from at least one of said fatty acids and at least one of said polyols, wherein a polyoxyethylene is added to said ester; and cyclic or open-chain forms of hemiacetals or acetals having more than four carbons.

3. A sodium percarbonate composition having improved solubility according to claim 2, wherein the concentration of said additive of group A ranges from 0.01 to 5 wt. % based on the weight of sodium carbonate, the concentrations of said additive of Group B ranges from 0.01 to 10 wt. % and the concentration of said polymer of formula (I) ranges from 0.01 to 10 wt. %.

4. A sodium percarbonate composition having improved solubility according to claim 1, wherein the concentration of said polymer of formula (1) ranges from 0.01 to 10 wt. %.

* * * * *

UNITED STATES PATENT AND TRADEMARK OFFICE
CERTIFICATE OF CORRECTION

PATENT NO. : 6,218,352 B1                                                                               Page 1 of 1
DATED : April 17, 2001
INVENTOR(S) : Sang Hwa Lee et al.

It is certified that error appears in the above-identified patent and that said Letters Patent is hereby corrected as shown below:

<u>Title page,</u>
Item [74], change "Ichonsi" to -- Inchonsi --.

Signed and Sealed this

Eighth Day of January, 2002

Attest:

Attesting Officer

JAMES E. ROGAN
*Director of the United States Patent and Trademark Office*